(12) United States Patent
Zhang et al.

(10) Patent No.: US 11,030,898 B2
(45) Date of Patent: Jun. 8, 2021

(54) METHODS AND SYSTEMS FOR MAP DATABASE UPDATE BASED ON ROAD SIGN PRESENCE

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 106 days.

(21) Appl. No.: 16/219,363

(22) Filed: Dec. 13, 2018

(65) Prior Publication Data

US 2020/0191591 A1 Jun. 18, 2020

(51) Int. Cl.
*G08G 1/0962* (2006.01)
*G01C 21/36* (2006.01)
(Continued)

(52) U.S. Cl.
CPC ......... *G08G 1/09623* (2013.01); *G01C 21/32* (2013.01); *G01C 21/3602* (2013.01);
(Continued)

(58) Field of Classification Search
CPC .............. G08G 1/0112; G08G 1/0141; G08G 1/09623; G08G 1/0129; G06K 9/00791;
(Continued)

(56) References Cited

U.S. PATENT DOCUMENTS 9,092,695 B1 * 7/2015 Ogale ................. G06K 9/6202
9,810,540 B1   11/2017 Chatham
(Continued)

FOREIGN PATENT DOCUMENTS

| JP | 2008051612 A | * | 3/2008 |
| JP | 2013108820 A |   | 6/2013 |
| WO | 2013056767 A1 |   | 4/2013 |

OTHER PUBLICATIONS

Novais, Helder et al., "Community Based Repository for Georeferenced Traffic Signs", 2017 24th Portuguese Meeting on Computer Graphics and Interaction (EPCGI), Date of Conference: Oct. 12-13, 2017, Guimadies, Portugal, 8 pages (Year: 2017).*

(Continued)

*Primary Examiner* — Faris S Almatrahi
*Assistant Examiner* — David A Testardi
(74) *Attorney, Agent, or Firm* — Ditthavong, Steiner & Mlotkowski

(57) ABSTRACT

A method, a system, and a computer program product may be provided for updating a map database to indicate presence status of a road sign. The method may include receiving a road sign observation from at least one vehicle. The method may further include determining a road sign confidence score based on the received road sign observation, wherein the road sign observation comprises at least one of a positive road sign observation and a negative road sign observation. Additionally, the method may include updating the map database to indicate the presence status of the road sign based on the road sign confidence score being above a predetermined threshold, wherein the confidence score is based on at least one of the positive road sign observation and the negative road sign observation.

15 Claims, 6 Drawing Sheets

(51) Int. Cl.
    *G06K 9/00*     (2006.01)
    *G01C 21/32*     (2006.01)
    *G01C 21/00*     (2006.01)

(52) U.S. Cl.
    CPC ..... *G01C 21/3841* (2020.08); *G01C 21/3859* (2020.08); *G06K 9/00818* (2013.01)

(58) Field of Classification Search
    CPC ............. G06K 9/00818; G05D 1/0088; G05D 1/0221; G05D 1/0246; G05D 1/0274; G05D 1/0278; G01C 21/3602; G01C 21/32; G01C 21/3841; G01C 21/3859
    See application file for complete search history.

(56) References Cited

U.S. PATENT DOCUMENTS

| | | | |
|---|---|---|---|
| 9,947,224 B2 | 4/2018 | Fairfield et al. | |
| 10,162,355 B2* | 12/2018 | Hayon | G08G 1/09623 |
| 2009/0074249 A1* | 3/2009 | Moed | G06K 9/00818 |
| | | | 382/104 |
| 2009/0138497 A1* | 5/2009 | Zavoli | G09B 29/106 |
| 2009/0228204 A1* | 9/2009 | Zavoli | G01S 19/48 |
| | | | 701/532 |
| 2012/0046855 A1* | 2/2012 | Wey | G06K 9/00791 |
| | | | 701/117 |
| 2012/0316780 A1 | 12/2012 | Huth | |
| 2013/0211700 A1* | 8/2013 | Igodt | G01C 21/32 |
| | | | 701/117 |
| 2016/0042239 A1* | 2/2016 | Fowe | G06K 9/00785 |
| | | | 382/104 |
| 2016/0117923 A1* | 4/2016 | Dannenbring | G08G 1/09623 |
| | | | 340/905 |
| 2016/0161265 A1* | 6/2016 | Bagheri | G01S 13/89 |
| | | | 701/450 |
| 2016/0275792 A1* | 9/2016 | Takiguchi | G01C 21/30 |
| 2016/0305794 A1* | 10/2016 | Horita | G01C 21/26 |
| 2016/0379485 A1* | 12/2016 | Anastassov | G08G 1/096775 |
| | | | 701/117 |
| 2017/0243483 A1* | 8/2017 | Kaneshige | B60R 1/12 |
| 2017/0277716 A1* | 9/2017 | Giurgiu | G01C 21/32 |
| 2017/0322035 A1* | 11/2017 | Dorum | G01C 21/32 |
| 2018/0068559 A1* | 3/2018 | Bjersing | G08G 1/09623 |
| 2018/0114299 A1* | 4/2018 | Hattori | G06T 5/008 |
| 2018/0188045 A1* | 7/2018 | Wheeler | G01C 21/30 |
| 2018/0231387 A1* | 8/2018 | Thiel | G01C 21/3602 |
| 2018/0246907 A1* | 8/2018 | Thiel | G01C 21/32 |
| 2019/0114493 A1* | 4/2019 | Ewert | G05D 1/0246 |
| 2019/0137287 A1* | 5/2019 | Pazhayampallil | G05D 1/0291 |
| 2019/0147257 A1* | 5/2019 | Lindemann | G06K 9/00818 |
| | | | 382/103 |
| 2019/0205674 A1* | 7/2019 | Silver | B60W 40/105 |
| 2019/0279007 A1* | 9/2019 | Zinner | G06K 9/6215 |
| 2019/0303693 A1* | 10/2019 | Watanabe | G08G 1/096716 |
| 2020/0160697 A1* | 5/2020 | Hayashi | G06F 16/29 |

OTHER PUBLICATIONS

Novais, Helder, Community Based Repository for Georeferenced Traffic Signs, 2018 Thesis, University do Minho Dissertation, Escola de Engenharia Departamento de Informática, Feb. 2018, 79 pages (Year: 2018).*

Stevenson, Jamie, "HERE Road Signs service points way to autonomous future", HERE360 web page, Nov. 21, 2016, 7 pages, downloaded from: https://360.here.com/2016/11/21/here-road-signs-service-points-way-to-autonomous-future/ (Year: 2016).*

\* cited by examiner

METHODS AND SYSTEMS FOR MAP DATABASE UPDATE BASED ON ROAD SIGN PRESENCE

TECHNOLOGICAL FIELD

The present disclosure generally relates to updating data for a map database, and more particularly relates to updating presence status of a road sign in the map database.

BACKGROUND

Mapping applications have been used extensively in automated driving of vehicles, based upon use of map databases for providing data for enabling such automated driving. Automated driving requires a high level of data accuracy for taking real-time driving decisions based on up to date data. One such piece of data may relate to presence of a road sign on a link. The road sign may be any traffic related sign or a non-traffic sign, such as a posted speed limit sign, a warning sign, a destination sign board, a diversion sign, a route guidance sign and the like. Data related to road signs has been traditionally received from probe vehicles and is used to update the map database quarterly.

However, the data should have a high level of accuracy to implement accurate driving decisions in near real-times, for autonomous, semi-autonomous, or user driven vehicles. The probe vehicles are sometimes inadequate in providing such high level of accuracy in near real-times.

BRIEF SUMMARY

The probe vehicles may be used for updating the map database using a specially owned fleet of such vehicles. However, such probe vehicles are only limited in number, and may help to provide such as quarterly update of data. However, such quarterly update may not be beneficial in cases which require immediate attention of the commuters. For example, if a link is undergoing some construction and/or repair activity, then to divert or warn the commuters, values of some road signs may change. Such as in the case of posted speed limit signs, posted speed values may normally be reduced to in the interest of commuters and construction workers' safety. Such changes need to be brought to immediate attention of the users of vehicles, as well as to be updated in navigation systems of autonomous and semi-autonomous vehicles as much in real-time as possible. In these cases, quarterly updates to map database about road sign data, which may lead to inaccurate reporting of posted speed limits to vehicles in real-time, is undesirable. Thus, what may be needed is more accurate and reliable methods and systems for providing near real-time update of map data, such as data about road signs.

The need for such accurate data updates may be met via ingestion of data from a vehicles' sensors, coupled with its analysis, coding and distribution of relevant information derived from the sensor data and conflated with other sources, such as the data from map database. The vehicles may comprise user vehicles, reporting such data back to the map database in near real-times. Since there can be thousands of such user vehicles, thus using this data, a map database may be updated in near real times.

The methods and systems disclosed herein provide for updating a map database using data from a vehicles' sensor, along with data from the map database, in near real times. Specifically, the methods and systems may provide for adding and removing data about a road sign, such as a posted speed sign, to the map database automatically using road sign observations from user (also hereinafter referred to as a customer) vehicles. In some embodiments, the methods and systems may provide for updating the map database to indicate presence status of a road sign, using road sign observations received in near real times at the map database. The methods may systems also provide for adding and deleting data about road signs to the map database automatically using road sign observations from customer vehicles. More specifically, the methods and systems provided herein may describe computing a confidence score for the road sign. If the computed confidence score drops below an experimentally determined threshold, the road sign may be deleted from the map database. However, if the computed confidence score is greater than the experimentally determined threshold, road sign may be added to the map database. Thus, the methods and systems may provide for automated addition or removal of road signs to the map database, such as in a digital map, based on vehicle observations. Using the methods and systems disclosed herein may have the advantage of providing daily map updated for the road signs, also providing more accurate map data for implementing robust driving decisions in vehicles.

A method, a system, and a computer program product are provided in accordance with an example embodiment described herein for updating a map database regarding data about road signs, in near real time. Embodiments disclosed herein may provide a method for updating a map database to indicate presence status of a road sign. The method may include receiving a road sign observation from at least one vehicle. The method may further include, determining, by a processor, a road sign confidence score based on the received road sign observation, wherein the road sign observation comprises at least one of a positive road sign observation and a negative road sign observation. Also, the method may include updating the map database to indicate the presence status of the road sign based on the road sign confidence score being above a predetermined threshold, wherein the confidence score is based on at least one of the positive road sign observation and the negative road sign observation. The method may further include updating the map database to indicate absence of the road sign if the road sign confidence score is below the predetermined threshold.

In some example embodiments, the road sign observation may comprise a positive road sign observation. The positive road sign observation may comprise location data and time information for the road sign at a vehicle location. In some example embodiments, the negative road sign observation may comprise data indicating absence of the road sign at the vehicle location. In some embodiments, the confidence score may comprise a ratio of a sum value of positive road sign observations and a sum value of all observations, wherein the sum value of all observations comprises a sum of positive road sign observations and negative road sign observations.

In some embodiments, receiving the road sign observation may further comprise receiving the road sign observation within a predefined duration of time.

In some exemplary embodiments, the predetermined threshold may be determined based on a hysteresis value associated with the predetermined threshold.

In additional embodiments, updating the map database may further comprise adding or deleting the road sign from the map database.

In an example embodiment, a system for updating a map database may be provided. The system may include at least one non-transitory memory configured to store computer program code instructions, and at least one processor configured to execute the computer program code instructions to at least: receive a road sign observation from at least one vehicle, determine a road sign confidence score based on the received road sign observation, wherein the road sign observation comprises at least one of a positive road sign observation and a negative road sign observation, and update the map database to indicate a presence status of the road sign based on the road sign confidence score being above a predetermined threshold, wherein the confidence score is based on at least one of the positive road sign observation and the negative road sign observation.

Embodiments of the present invention may provide a computer program product including at least one non-transitory computer-readable storage medium having computer-executable program code instructions stored therein. The computer-executable program code instructions when executed by a computer, cause the computer to carry out operations for updating a map database, the operations including: receiving a road sign observation from at least one vehicle, determining, by a processor, a road sign confidence score based on the received road sign observation, wherein the road sign observation comprises at least one of a positive road sign observation and a negative road sign observation, and updating the map database to indicate the presence status of the road sign based on the road sign confidence score being above a predetermined threshold, wherein the confidence score is based on at least one of the positive road sign observation and the negative road sign observation.

BRIEF DESCRIPTION OF THE DRAWINGS

Figure 1:
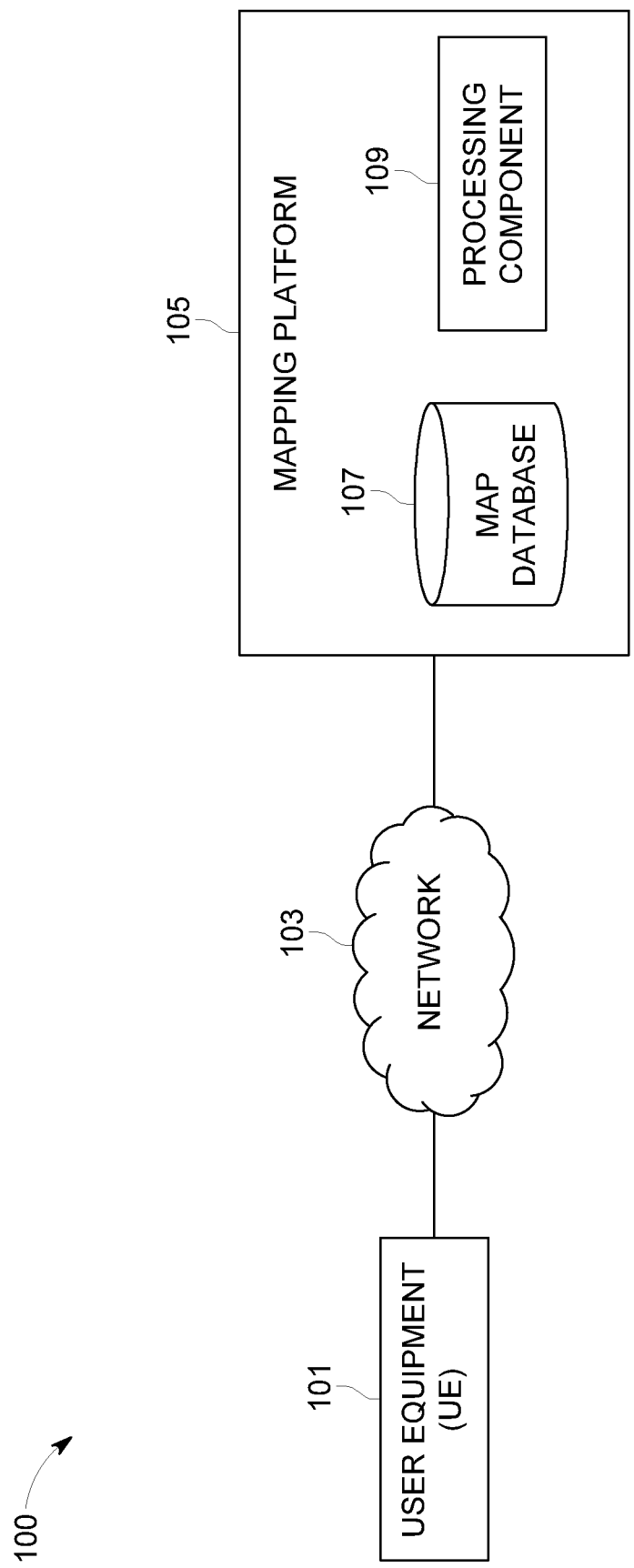
Figure 2:
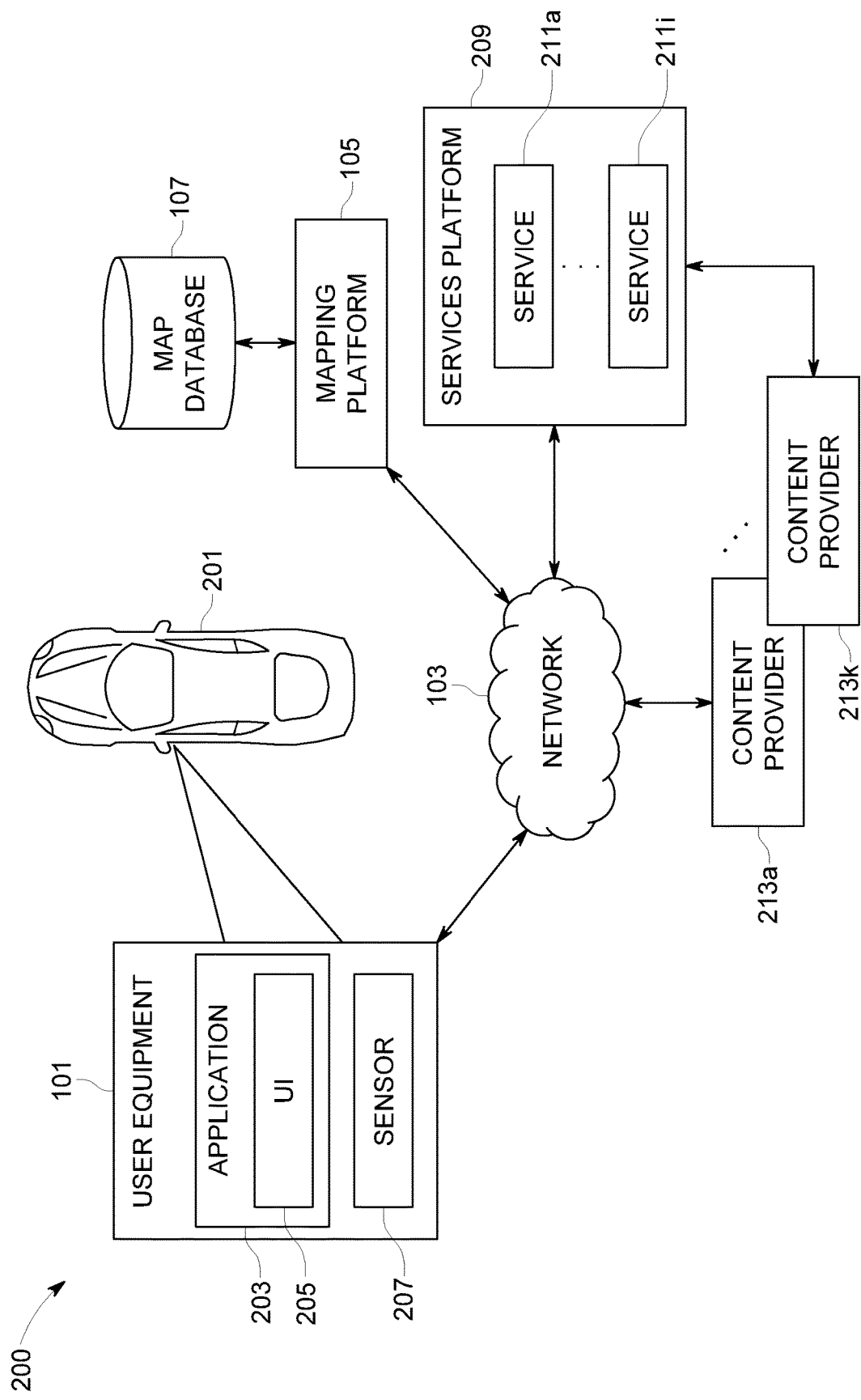
Figure 3:
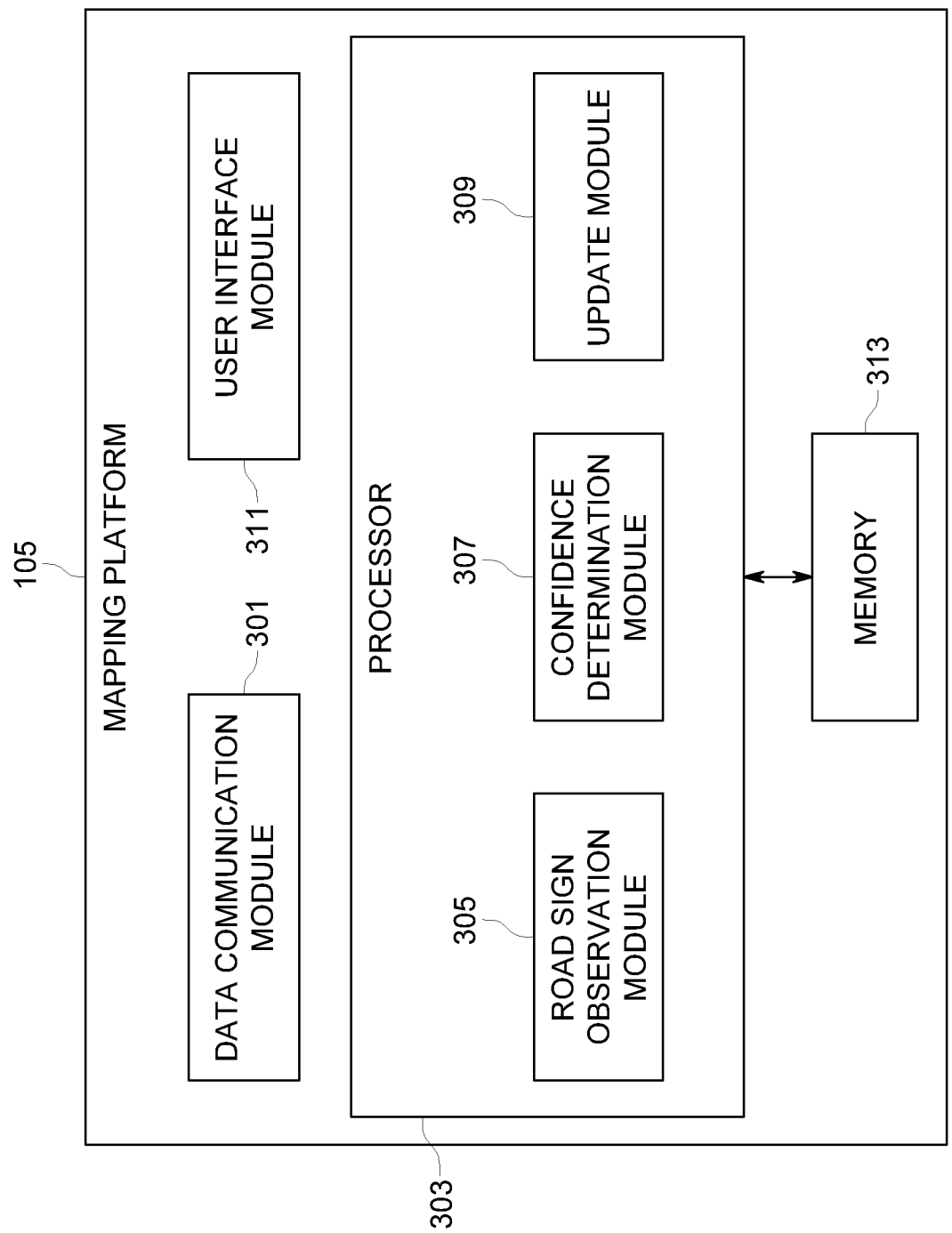
Figure 4:
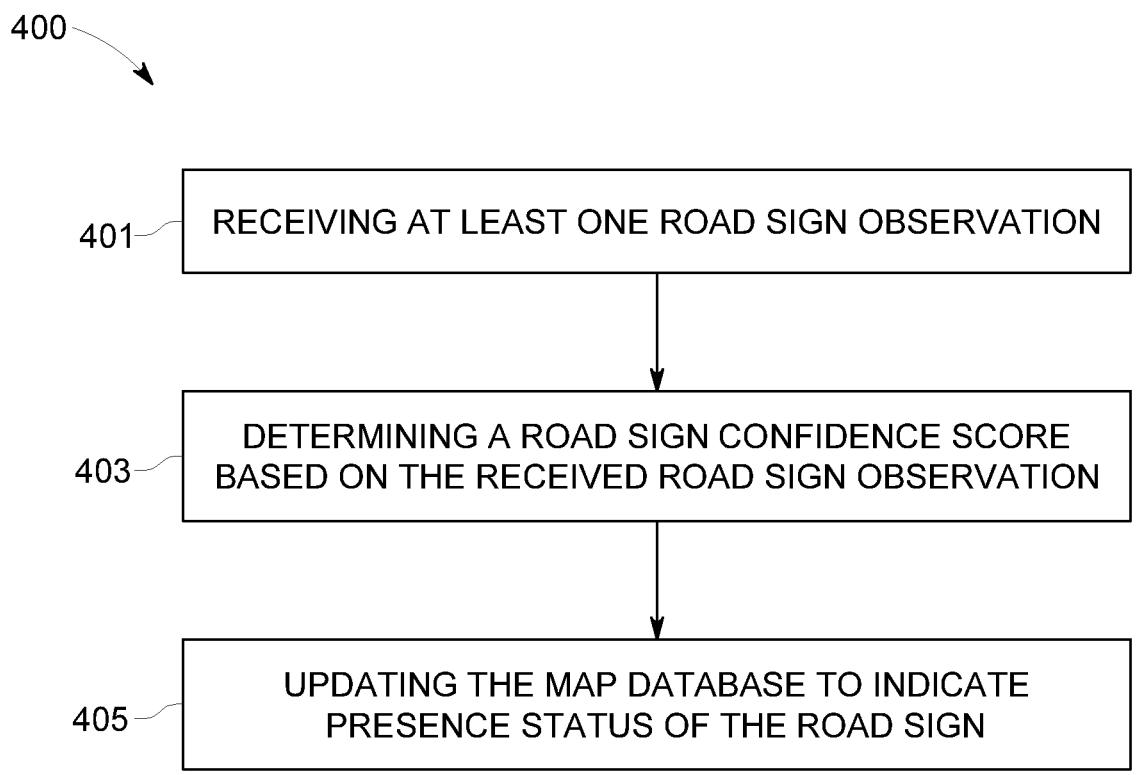
Figure 5:
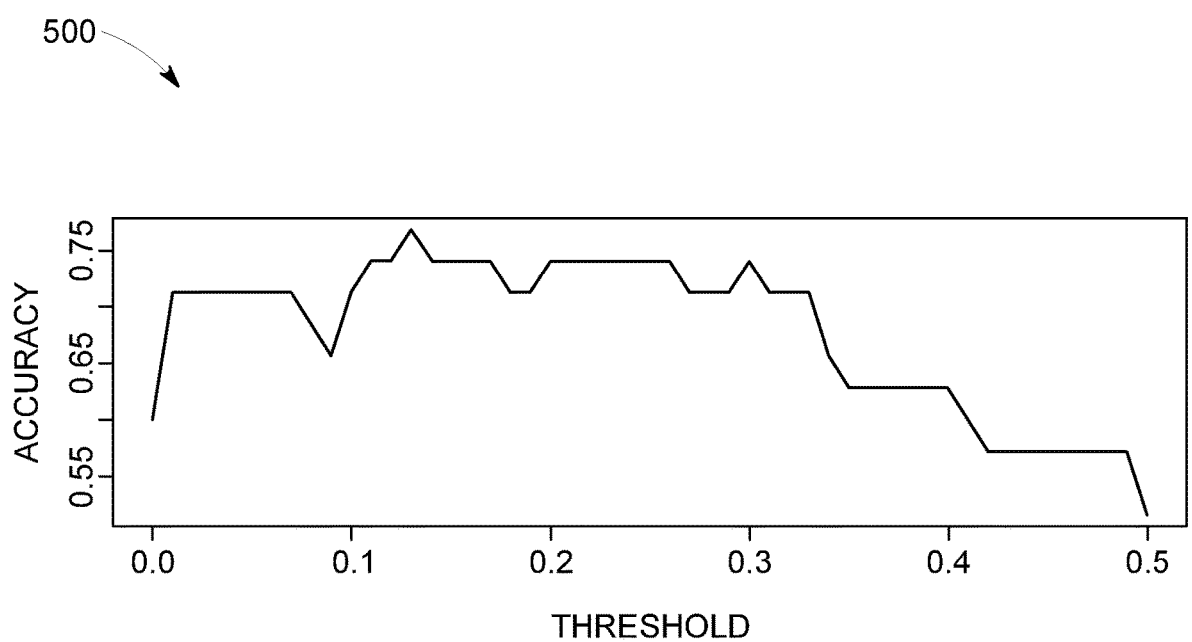
Figure 6A:
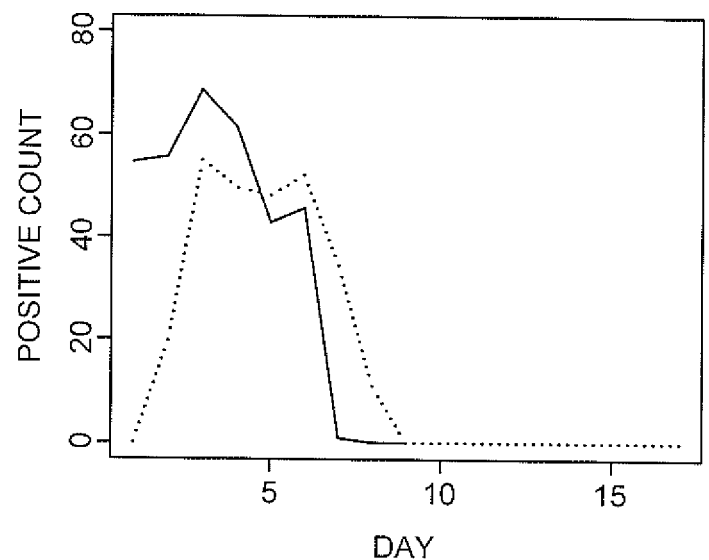
Figure 6B:
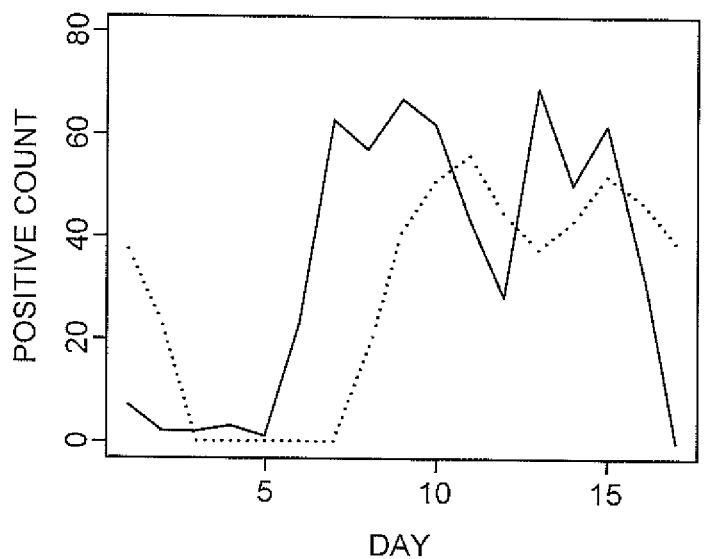

Having thus described example embodiments of the invention in general terms, reference will now be made to the accompanying drawings, which are not necessarily drawn to scale, and wherein:

FIG. 1 illustrates a schematic diagram of a system updating a map database, in accordance with an example embodiment;

FIG. 2 illustrates a block diagram of one embodiment of a system for updating the map database with road sign data, in accordance with an example embodiment;

FIG. 3 illustrates a block diagram of a mapping platform exemplarily illustrated in FIG. 2 that may be used to update the map database with the road sign data, in accordance with an example embodiment;

FIG. 4 illustrates a method for updating the map database, in accordance with an example embodiment;

FIG. 5 illustrates a graphical diagram for determination of an optimal threshold value for road sign confidence score, in accordance with an example embodiment; and FIGS. 6A-6B illustrate graphical diagrams showing observations data variations, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "road sign" may be used to refer to any traffic or non-traffic related sign, such as a speed limit sign, a distance indicating sign, a destination sign board, a diversion sign, a warning sign, a toll indicating sign, a lane indicating sign, a sign showing a curvature ahead, a sign showing a sharp turn, a sign showing static and/or dynamic speed limits and the like.

The term "road sign observation" may be used to refer to observation taken from a vehicle, such as a customer vehicle or a probe vehicle, using one or more sensors associated with the vehicle. The observation may be related to any road sign observed by the vehicles' during a route of travel of the vehicle.

The term "route" may be used to refer to a path from a source location to a destination location on any link.

End of Definitions

A method, a system, and a computer program product are provided herein in accordance with an example embodiment for providing map database update regarding data related to road signs. The data related to road signs may indicate a presence status for the road sign. The presence status may provide information about whether a road sign is present or absent on a link, and the road sign may be added to or deleted from the map database accordingly. The update to the map database may be provided on the basis of road sign observations taken using vehicle sensors, and conflated with other sources. These vehicles may comprise customer or user vehicles, which can be plenty in number, thus providing near real-time update of the map database with information about road signs. The methods and systems disclosed herein may provide for adding and removing road signs from the map database automatically using road sign observations from the vehicles. The methods and systems may provide for determining the confidence for a road sign using observations from customer vehicles. If the confidence drops below a threshold, the road sign is deleted from the map database. However, if the confidence supersedes the threshold, the road sign is added to the map database. Thus, using the methods and systems disclosed herein, the map database may be updated nearly daily with information about road signs.

FIG. 1 illustrates a schematic diagram of a system 100 for updating a map database with information about road signs, in accordance with an example embodiment. The system 100 includes a user equipment (UE) or a user device 101, which may be in communication with a mapping platform 105, over a network 103. The network 103 may be wired, wireless, or any combination of wired and wireless communication networks, such as cellular, Wi-Fi, internet, local area networks, or the like. The user equipment 101 may be a navigation system, that may be configured to provide route guidance and navigation related functions to the user of a vehicle. In some embodiments, the user equipment 101 may be installed in the vehicle and may capture road signs along pathways. The user equipment 101 may also include an image capturing device, such as a camera for capturing the road signs, for example speed limit signs. On capturing the road sign, the user equipment 101 may generate a road sign observation. In some embodiments, the vehicle may also include one or more other sensors, apart from the camera, for generating the road sign observation. The road sign may be a static road sign or variable road signs positioned along the pathways. Sign values of the variable road sign may vary based on traffic conditions in the vicinity of the variable road sign, such as, LCD display panels, LED panels, etc. The user equipment 101 or the sensors in the vehicle may transmit the generated road sign observation to an OEM cloud sequentially. In an embodiment, the road sign observation may be scheduled to be transmitted to the OEM cloud in batches.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a user interface of a mapping application, such that the user equipment 101 may provide navigational assistance to the user among other services provided through access to the mapping platform 105.

As exemplarily illustrated, the mapping platform 105 may also include a map database 107, which may store node data, road segment data or link data, point of interest (POI) data, posted signs related data, road sign data, or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records. The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The map database 107 may additionally include data related to roadwork zones, such as, location of the roadwork zones, diversions to be caused due to the roadwork zones, suggested routes to avoid congestion to be caused due to the roadwork zones, etc. The data related roadwork zones may be fetched by the system 100 from external systems, such as, roadwork planning system of the municipalities. The map database 107 may additionally include data about road signs, such as traffic or non-traffic related signs.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. Crowdsourcing may be based on gathering data using customer vehicles. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment, a road sign or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 101, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 107 may be a master geographic database configured at a server side, but in alternate embodiments, a client side map database 107 may represent a compiled navigation database that may be used in or with end user devices (e.g., user equipment 101) to provide navigation, speed adjustment and/or map-related functions such as update of the map database 107. The mapping platform 105 may provide a confidence score determination for the road sign, based on road sign observation data collected in the map database 107, such as using the customer vehicles. Furthermore, the mapping platform 105 may provide a threshold for confidence score comparison, for the purpose of updating the data about the road sign in the map database 107. The update operation may include such as adding or deleting the road sign from the map database 107. The map database 107 may be used with the end user device, that is, the user equipment 101 to provide the user with navigation features and information about the road sign to be used in navigation functions. In such a case, the map database 107 may be downloaded or stored on the user equipment 101 which may access the mapping platform 105 through a wireless or wired connection, over the network 103.

In one embodiment, the user device or the user equipment 101 may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes, according to some example embodiments. In some embodiments, the user of the vehicle may be notified by the mapping platform 105 about the presence status of the road sign and the user may use the user equipment 101, for example, the in-vehicle navigation system for navigation and map functions such as guidance and map display, according to some example embodiments. The user equipment 101 may include an application, for example, a mapping application with a user interface that may enable the user to access the mapping platform 105 for availing the functions disclosed above, such as, for navigating through a route.

FIG. 2 exemplarily illustrates a block diagram of one embodiment of a system 200 for updating a map database 107. The vehicle 201 may be a user driven vehicle a semi-autonomous vehicle or an autonomous vehicle. An autonomous vehicle, as used throughout this disclosure, may refer to a vehicle having autonomous driving capabilities at least in some conditions. The system 200 includes a user equipment 101, including an application 203 with a user interface 205 for accessing one or more map and navigation related functions. The user equipment 101 may also include one or more sensors 207 such as a camera, an acceleration sensor, a gyroscopic sensor, a LIDAR sensor, a proximity sensor, a motion sensor and the like. The sensors 207 may primarily be used for detecting road signs and determining positioning of the vehicle 201 and the sensors 207 may be built-in or embedded into or within interior of the user equipment 101. In some embodiments, the user equipment 101 uses communication signals for position determination. The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 207 may be used to gather information related to an environment of the vehicle 201, such as, the road signs. In some embodiments, the vehicle 201 may have sensors positioned on or within and the sensors may provide data indicating a location of the vehicle 201, heading data associated with road signs, sign types of the road signs, sign values of the road signs and the like. The data collected by the sensors may be transmitted to the OEM cloud. Vehicle data may be collected by any device capable of determining the necessary information, and providing the necessary information to a remote entity. The user equipment 101 is one example of a device that may function as a probe to collect vehicle data.

More specifically, the vehicle data may be used to collect observations related to a road sign, also referred to as road sign observation, which may be indicative of the presence status of the road sign. The observation of road sign may be may be collected while a vehicle 201 is traveling along a route. In some example embodiments, the road sign observations may be collected from a plurality of vehicles over a predetermined duration of time, such as 24 hours or 48 hours or any other such duration. The observations may be collected by the mapping platform 105 which may be in communication with the user equipment 101 associated with the plurality of vehicles. According to the example embodiment described below with the vehicle data being from motorized vehicles traveling along roadways, the vehicle data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 101, may be any device capable of collecting the aforementioned probe data. In one example, using the sensor data from the user equipment 101, a mapping platform 105 similar to the mapping platform exemplarily illustrated in FIG. 1, may generate at least one road sign observation to assist the vehicle 201 and other similar vehicles to navigate through the various routes including different links. The sensor data generated by the sensors 207 may constitute road sign observations. That is, the sensors 207 installed in the vehicle or the user equipment may capture road signs along the pathway and capture the location of the road sign, type of the road sign, value of the road sign, heading at the location of the road sign, and time stamp associated with the time of capture of the road sign. The captured location of the road sign, type of the road sign, value of the road sign, heading at the location of the road sign, and time stamp associated with the capture of the road sign constitute the road sign observations. The processing of the road sign observations to indicate presence status of the road sign and thereby to add or delete the road sign from the map database 107, may be performed by the processor 303, exemplarily illustrated in FIG. 3, same as a processing component 109 exemplarily illustrated in FIG. 1, in the mapping platform 105 exemplarily illustrated in FIG. 3.

The system 200 may further include a services platform 209, which may be used to provide navigation related functions and services 211a-211i to the application 203 running on the user equipment 101. The services 211a-211i may include such as navigation functions, speed adjustment functions, traffic related updates, weather related updates, warnings and alerts, parking related services, indoor mapping services and the like. The services 211a-211i may be provided by a plurality of content providers 213a-213k. In some examples, the content providers 213a-213k may access various SDKs from the services platform 209 for implementing one or more services. In an example, the services platform 209 and the mapping platform 105 may be integrated into a single platform to provide a suite of mapping and navigation related applications for OEM devices, such as the user equipment 101. The user equipment 101 may be configured to interface with the services platform 209, the content provider's services 213a-213k, and the mapping platform 105 over a network 103. Thus, the mapping platform 105 and the services platform 209 may enable provision of cloud-based services for the user equipment 101, such as, storing the road sign observations in a OEM cloud in batches or in real-time and retrieving the stored road sign observations for updating the map database 107, as disclosed in the detailed description of FIG. 3, by the vehicle 201 carrying the user equipment 101.

FIG. 3 illustrates a block diagram of a mapping platform 105 exemplarily illustrated in FIG. 2 that may be used to update the map database 107, in accordance with an example embodiment of the present invention. In the embodiments described herein, the mapping platform 105 comprises a data communication module 301, a road sign observation module 305, a confidence determination module 307, an update module 309, and a user interface module 311. In this embodiment exemplarily illustrated in FIG. 3, the road sign observation module 305, the confidence determination module 307, and the update module 309, is embodied within a processor 303. The processor 303 may retrieve computer program code instructions that may be stored in a memory 313 for execution of the computer program code instructions by the modules 305, 307, and 309 of the mapping platform 105. The processor may control the execution of the computer program code instructions by the various modules (viz. 301, 305, 307, 309, and 311) of the mapping platform 105. In one embodiment, the data communication module 301 communicates with the sensors 207 disclosed in the detailed description of FIG. 2 and may receive the sensor data and the road sign observations from the sensors 207. In an embodiment, the data communication module 301 may receive the road sign observations from the OEM cloud over the network 103. The road sign observations may refer to sensor data collected from cars as sensors, that is, sensors are installed in the vehicle 201 or in the user equipment 101 in the vehicle 201. The sensor data may be generated on detection of static road signs positioned along the pathways. In an embodiment, the road sign observations may refer to sensor data from digital or dynamic signs, such as, LED panels, LCD panels, etc., positioned along the pathways. In some example embodiments, the data communication module 301 may also receive destination information of a user of the vehicle 201 via the network 103. The road sign observations comprise time of capture of the road sign from vehicles such as, 201 as a time stamp associated with each of the road sign observations. A plurality of vehicles, such as, 201 passing by the location of each of the road signs on the pathway, generate a plurality of road sign observations for each of the road signs. Thus, each road sign observation is different from other road sign observation based on location data, heading data, road sign value, and road sign type, and time of capture of the road sign from a vehicle. The data communication module 301 may receive sensor data configured to describe a position of the user equipment 101 installed in the vehicle 201, or a controller of the user equipment 101 may receive the sensor data from the positioning system of the user equipment 101. The location of the road sign is the location of capture of the road sign from vehicles, such as, 201 and the location of the road sign constitutes the location data in a road sign observation.

Similarly, the heading associated with a road sign is the heading of the vehicle capturing the road sign and the heading of the road sign is the heading data in a road sign observation. The data inputted to the mapping platform 105, for example, the sensor data, etc., is transformed, processed, and executed upon by the mapping platform 105 to identify whether it is a positive observation or a negative observation, by the road sign observation module 305. The sensor data from the different sensors installed in the user equipment 101 or the vehicle 201 may be converted to units and ranges compatible with the mapping platform 105, to accurately generate the road sign observations.

In some example embodiments, the road sign observation module 305 may process a plurality of road sign observations captured by the plurality of vehicles, such as, 201. The road signs generated are associated with corresponding time stamps, corresponding locations, corresponding headings, and corresponding sign values. The road sign observation module 305 may perform processing to identify one of two kinds of road sign observations, a positive road sign observation and a negative road sign observation.

The positive road sign observation may include information about location of the road sign and time information of taking the road sign observation. For example, the road sign observation comprising an explicit report from the vehicle that the vehicle observed a road sign at a location with coordinates (x,y,z) and time (t) may comprise the positive road sign observation.

The negative road sign observation may include data indicating absence of the road sign at a location, such as the location of the vehicle. Thus, the negative road sign observation may comprise a report from the vehicle stating that the vehicle expected to see a road sign at the given location, but the road sign was not observed. That is to say, the vehicle may not provide explicit negative observations, but negative observations may be inferred from vehicle traces. In some example embodiments, the road sign observation module 305 may be configured to perform the inference of vehicle traces to identify whether a road sign observation is a negative observation. The inference may be done by analyzing that if a vehicle passes by a road sign according to their GPS path, and the vehicle did not report the road sign to the mapping platform 105, then it is considered as one negative road sign observation. Thus, the negative road sign observation may be specifically advantageous in increasing the accuracy of the methods and systems disclosed herein in view of the prior art methods and systems which mostly rely only on positive road sign observations. The positive and negative road sign observations may be processed further to determine a confidence score for an observed road sign. The dependence of the confidence score on the negative road sign observations helps in increasing the accuracy of reporting the road sign correctly to the mapping platform 105. The processing for determining the confidence score may be performed by the confidence determination module 307.

In some example embodiments, the road sign observations received within a predefined duration of time may be considered for determining the confidence score. The predefined duration of time may be set as the most optimum duration of time based on experimental analysis. For example, the road sign observations received within the last 24 hours or received within the last 48 hours may be considered based on experimental validation of results of considering each of these cases, to determine which duration gives more accuracy in reporting the presence of the road sign more accurately. There may be a large number of such road sign observations which are received from the vehicle 201, such as the customer vehicle. After each of these observations has been classified as either a positive road sign observation or as a negative road sign observation by the road sign observation module 305, the confidence score for the current road sign may be calculated as a ratio of a sum value of positive road sign observations and a sum value of all observations, wherein the sum value of all observations comprises a sum of positive road sign observations and negative road sign observations. The same may be stated mathematically as:

> Road sign existence confidence score=total positive observation/(total positive observations+total negative observations)

Further, the confidence score may be compared against a predetermined threshold to update the map database 107 to indicate the presence status of the road sign. More specifically, If (road sign existence confidence score<predetermined threshold), then the road sign may be removed sign from the map database, and If (sign existence confidence>=predetermined threshold), then the road sign may be added to the map database. The update of the map database based on the comparison of the road sign confidence score with the predetermined threshold may be performed by the update module 309 of the mapping platform 105. The predetermined threshold value may be determined based on experimental analysis of ground truth data, as illustrated in the FIG. 5, which will be described in more details later.

In some example embodiments, the determination of the presence status of the road sign may be used to provide an indication on the user interface module 311 of the mapping platform 105 in the form of notifications being pushed to user devices 101 that road sign is present or absent at a given location. In an embodiment, the user interface module 311 may render indications of the presence status of the road sign on the user interface 205. In an embodiment, the user interface module 311 may provide navigation suggestions to the user of the vehicle 201 to slow down in case of a reduced speed limit sign observed at a construction location. The user interface module 311 may be configured to update the rendered suggestions on receiving control instructions from the processor 303.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 may be in communication with a memory 313 via a bus for passing information among components of the system 200. The memory 313 may be non-transitory and may include, for example, one or more volatile and/or non-volatile memories. In other words, for example, the memory 313 may be an electronic storage device (for example, a computer readable storage medium) comprising gates configured to store data (for example, bits) that may be retrievable by a machine (for example, a computing device like the processor 303). The memory 313 may be configured to store information, data, content, applications, instructions, or the like, for enabling the apparatus to carry out various functions in accordance with an example embodiment of the present invention. For example, the memory 313 could be configured to buffer input data for processing by the processor 303. As exemplarily illustrated in FIG. 3, the memory 313 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based mapping platform 105 for providing navigation and parking recommendation services and map database update services.

In some embodiments, the mapping platform 105 may be configured to provide a repository of algorithms for implementing a plurality of location based services for navigation systems. For example, the mapping platform 105 may include algorithms related to geocoding, routing (multi-modal, intermodal, and unimodal), clustering algorithms, machine learning in location based solutions, natural language processing algorithms, artificial intelligence algorithms, and the like. The data for different modules of the mapping platform 105 may be collected using a plurality of technologies including but not limited to drones, sensors, connected cars, cameras, probes, chipsets and the like. The collected data may be processed by the processor 303 to provide an update of the map database 107 in near real time regarding the presence status of a road sign. As noted above, the mapping platform 105 may be embodied by the processing component. However, in some embodiments, the mapping platform 105 may be embodied as a chip or chip set. In other words, the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 105 may therefore, in some cases, be configured to implement an example embodiment of the present invention on a single "system on a chip." As such, in some cases, a chip or chipset may constitute a means for performing one or more operations for providing the functionalities described herein.

The user interface 205 of the user equipment 101 may in turn be in communication with the processor 303 to provide output to the user and, in some embodiments, to receive an indication of a user input. In some example embodiments, the system 200 may include a user interface 205 that communicates with the processor 303 and displays input and/or output of the mapping platform 105. As such, the user interface 205 may include a display and, in some embodiments, may also include a keyboard, a mouse, a joystick, a touch screen, touch areas, soft keys, one or more microphones, a plurality of speakers, or other input/output mechanisms. In one embodiment, the processor 303 may comprise user interface circuitry configured to control at least some functions of one or more user interface elements such as a display and, in some embodiments, a plurality of speakers, a ringer, one or more microphones and/or the like. The processor 303 and/or user interface circuitry comprising the processor 303 may be configured to control one or more functions of one or more user interface elements through computer program instructions (for example, software and/or firmware) stored on a memory accessible to the processor 303 (for example, memory device 310, and/or the like). In some example embodiments, the processor 303 may be configured to provide a method for updating the map database 107 as will be discussed in conjunction with FIG. 4 as below.

FIG. 4 exemplarily illustrates a method 400 for updating a map database to indicate the presence status of a road sign, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 313 of the mapping platform 105, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 313 that may direct a computer or other programmable apparatus to function in a particular manner, such that the instructions stored in the computer-readable memory 313 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for updating a map database to indicate the presence status of a road sign includes, at 401, receiving a road sign observation. The road sign observation may be received from at least one vehicle, by the mapping platform 105. In some example embodiments, a plurality of such road sign observations may be collected from thousands of customer vehicles within a predetermined duration of time, such as 24 hours or 48 hours. The plurality of road sign observations collected in this way may further by classified as positive road sign observations and negative road sign observations. The positive road sign observation may indicate location and time data for the road sign, while the negative road sign observation may include data indicating absence of the road sign, such as based on vehicles; traces. Once the road sign observation has been received in this way, the method 400 may further include, at 403, determining a road sign confidence score based on the received road sign observation. In some example embodiments, the road sign confidence score may be based on a ratio comprising the negative road sign observations. Specifically, the road sign confidence score may be computed as a ratio of a sum value of positive road sign observations and a sum value of all observations, wherein the sum value of all observations comprises a sum of positive road sign observations and negative road sign observations. Further, the method 400 may include, at 405, updating the map database to indicate the presence status of the road sign. The update may be performed based on the comparison of the road sign confidence score with a predetermined threshold. If the road sign confidence score is above the predetermined threshold, then the map database may be updated to indicate the presence of the road sign. On the other hand, if the road sign confidence score is below the predetermined threshold, then the map database may be updated to indicate the absence of the road sign. Further based on determining the presence or absence of the road sign, the map database may be updated to add or delete the road sign, respectively, to the map database.

In an example embodiment, a system for performing the method of FIG. 4 above may comprise a processor (e.g. the processor 303) configured to perform some or each of the operations (401-405) described above. The processor may, for example, be configured to perform the operations (401-405) by performing hardware implemented logical functions, executing stored instructions, or executing algorithms for performing each of the operations. Alternatively, the system may comprise means for performing each of the operations described above. In this regard, according to an example embodiment, examples of means for performing operations 401-405 may comprise, for example, the processor 303 and/or a device or circuit for executing instructions or executing an algorithm for processing information as described above.

On implementing the method 400 disclosed herein, the end result generated by the mapping platform 105 is a tangible determination of the presence status of the road sign and corresponding update of the map database accordingly.

Example embodiments disclosed herein provides an improvement in navigation technology related to identification of presence of road signs and real time update of map database. The methods and systems disclosed herein use the data provided by customer vehicles, and perform cloud based processing of such data, using the mapping platform to provide most up to date and accurate information about the presence of road signs on various links.

The accuracy of the determination of the road sign presence also depends upon choosing an optimal threshold value for confidence score comparison. The optimal threshold value determination may be explained in conjunction with FIG. 5 as follows.

FIG. 5 illustrates a graph 500 of confidence threshold vs accuracy. The threshold values are plotted along the x-axis and the accuracy values are plotted along the y-axis. The accuracy of the y-axis is determined by comparing the output of the method 400 to ground truth data. In the FIG. 5, as illustrated, the highest accuracy is achieved when the sign existence confidence is 0.14-0.15. Thus, using the graph 500 illustrated in FIG. 5, the optimal threshold value may be set to 0.15.

However, for more accurate analysis, another factor needs to be considered for setting optimal threshold value for the confidence score comparison. That factor is hysteresis. Hysteresis may be defined as the adjustment in the optimal threshold value to avoid jitter in the system. The jitter in the system of map database update may cause incorrect addition or removal of a road sign to the map database due to noise. For example, if on a day 'n' the confidence score computed is 0.16 the road sign would be added to the map and if on day 'n+1' the confidence is 0.14, the sign would be deleted. However, this change in confidence could be due to noise. Thus, to prevent such jitter, hysteresis may be considered. For example, in this case, an upper hysteresis of 0.20 and a lower hysteresis of 0.15 may be considered. If the confidence surpasses the upper hysteresis value of 0.20 then the road sign is added to the map database. Similarly, if the confidence falls below 0.15, then the road sign is removed from the map database. This strategy controls jitter that is due to random noise in the vehicle observations. Noise from vehicle observations exist for example, when a vehicle did not observe a road sign due its line of sight been obstructed due to a large truck. Therefore, the vehicle wrongly generates a negative observation. Using these and other experimental validations, the accuracy of the map database methods and systems disclosed in the present invention may further be enhanced. For example, FIGS. 6A-6B illustrates experimental analysis of using different values for predetermined duration of time for collecting road sign observations.

FIGS. 6A-6B illustrate a comparison of using a 24 hour duration or a 48 hour duration collecting road sign observations for two different locations in the two figures, FIG. 6A for a first location and FIG. 6B for a second location.

The solid line indicates the positive count of signs in the past 24 hours from raw data, compared with the results with output data which are derived for the past 48 hours (shown as a dotted line). The first road sign, in FIG. 6A, is removed on a particular date, such as June 5 and the second road sign, shown in FIG. 6B, is added on June 5. The value differences are due to that positive count of signs in the past 24 hours may contain duplications.

Overall it may be observed that the road sign deletion or addition may have delay of 1-2 days by using the 48-hour setting. On the other hands, the result can be better and more robust if the 24-hour setting is used. The current values of 24 hours and 48 hours have been considered for exemplary purpose only. The value for predetermined duration of time may be configurable and may change as more and more customer vehicles are deployed to collect the road sign observation data.

Like the predetermined duration validation, experimental analysis may also be used for verifying the accuracy of the overall method for map database update disclosed in the present invention.

In some example embodiments, to determine the confidence one can use a moving average where the previous days observation is considered when providing an estimate of confidence for the current day.

Generally, the method disclosed herein and the threshold works and may be used to provide automated road sign addition and removal from the map database based on the computed confidence for each road sign in the map.

The methods and systems disclosed herein may be used to provide automated road sign addition and removal from the map database based on the computed confidence for each road sign in the map. The methods and systems disclosed herein may be used for effectively providing daily updates to the map data using a plurality, such as thousands of customer vehicles.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for updating a map database to indicate presence status of a road sign, comprising:
   receiving, over a network, a road sign observation of a sensor, an image capturing device, or a combination thereof on at least one vehicle;
   determining, by a processor, a road sign confidence score based on the received road sign observation, wherein the road sign observation comprises at least one of a positive road sign observation and a negative road sign observation, wherein the negative road sign observation comprises data indicating absence of the road sign at a vehicle location; and
   updating map data relating to the road sign stored in the map database in near real-time to indicate the presence status of the road sign based on the road sign confidence score being above a predetermined threshold,
   wherein the road sign observation comprises a plurality of positive road sign observations and a plurality of negative road sign observations, and wherein the confidence score comprises a ratio of a sum value of the plurality of positive road sign observations and a sum value of the plurality of positive road sign observations and the plurality of negative road sign observations.

2. The method of claim 1 further comprising, updating the map database to indicate absence of the road sign while the road sign confidence score is below the predetermined threshold.

3. The method of claim 1, wherein the positive road sign observation comprises location data and time information for the road sign at a vehicle location.

4. The method of claim 1, wherein receiving the road sign observation further comprises receiving the road sign observation within a predefined duration of time.

5. The method of claim 1, wherein the predetermined threshold is determined based on a hysteresis value associated with the predetermined threshold.

6. The method of claim 1, wherein updating the map database further comprises adding or deleting the road sign from the map database.

7. A system for updating a map database, comprising:
   at least one non-transitory memory configured to store computer program code instructions; and
   at least one processor configured to execute the computer program code instructions to:
   receive, over a network, a road sign observation of a sensor, an image capturing device, or a combination thereof on at least one vehicle;
   determine a road sign confidence score based on the received road sign observation, wherein the road sign observation comprises at least one of a positive road sign observation and a negative road sign observation, wherein the negative road sign observation comprises data indicating absence of the road sign at a vehicle location; and
   update map data relating to the road sign stored in the map database in near real-time to indicate a presence status of the road sign based on the road sign confidence score being above a predetermined threshold,
   wherein the road sign observation comprises a plurality of positive road sign observations and a plurality of negative road sign observations, and wherein the confidence score comprises a ratio of a sum value of the plurality of positive road sign observations and a sum value of the plurality of positive road sign observations and the plurality of negative road sign observations.

8. The system of claim 7, wherein the processor is further configured to execute the computer program code instructions to update the map database to indicate absence of the road sign while the road sign confidence score is below the predetermined threshold.

9. The system of claim 7, wherein the positive road sign observation comprises location data and time information for the road sign at a vehicle location.

10. The system of claim 7, wherein receiving the road sign observation further comprises receiving the road sign observation within a predefined duration of time.

11. The system of claim 7, wherein the predetermined threshold is determined based on a hysteresis value associated with the predetermined threshold.

12. The system of claim 7, wherein updating the map database further comprises adding or deleting the road sign from the map database.

13. A computer program product comprising at least one non-transitory computer-readable storage medium having stored thereon computer-executable program code instructions which when executed by a computer, cause the computer to carry out operations for updating a map database, the operations comprising:
   receiving, over a network, a road sign observation of a sensor, an image capturing device, or a combination thereof on at least one vehicle;
   determining, by a processor, a road sign confidence score based on the received road sign observation, wherein the road sign observation comprises at least one of a positive road sign observation and a negative road sign observation, wherein the negative road sign observation comprises data indicating absence of the road sign at a vehicle location; and
   updating map data relating to the road sign stored in the map database in near real-time to indicate presence status of the road sign based on the road sign confidence score being above a predetermined threshold,
   wherein the road sign observation comprises a plurality of positive road sign observations and a plurality of negative road sign observations, and wherein the confidence score comprises a ratio of a sum value of the plurality of positive road sign observations and a sum value of the plurality of positive road sign observations and the plurality of negative road sign observations.

14. The computer program product of claim 13, wherein the operations further comprise:

computer program code instructions to update the map database to indicate absence of the road sign while the road sign confidence score is below the predetermined threshold.

15. The computer program product of claim 13, wherein the positive road sign observation comprises location data and time information for the road sign at a vehicle location.

\* \* \* \* \*